(12) United States Patent
Mitchell

(10) Patent No.: US 11,852,569 B2
(45) Date of Patent: Dec. 26, 2023

(54) SYSTEM AND METHOD FOR LOW PRESSURE LOW FLOW DILUTION EXTRACTION GAS SAMPLING

(71) Applicant: CEMTEK Systems Inc, Ocean, NJ (US)

(72) Inventor: Sean D. Mitchell, Point Pleasant Borough, NJ (US)

(73) Assignee: CEMTEK SYSTEMS INC., Ocean, NJ (US)

( * ) Notice: Subject to any disclaimer, the term of this patent is extended or adjusted under 35 U.S.C. 154(b) by 0 days.

(21) Appl. No.: 17/847,786

(22) Filed: Jun. 23, 2022

(65) Prior Publication Data

US 2022/0316998 A1 Oct. 6, 2022

Related U.S. Application Data

(62) Division of application No. 16/744,451, filed on Jan. 16, 2020, now Pat. No. 11,402,303.

(60) Provisional application No. 62/794,822, filed on Jan. 21, 2019.

(51) Int. Cl.
  *G01N 1/22* (2006.01)
  *G01N 1/31* (2006.01)
  *G01N 1/38* (2006.01)

(52) U.S. Cl.
  CPC ......... *G01N 1/2258* (2013.01); *G01N 1/2205* (2013.01); *G01N 1/31* (2013.01); *G01N 2001/2264* (2013.01); *G01N 2001/2288* (2013.01); *G01N 2001/386* (2013.01)

(58) Field of Classification Search
  CPC ...... G01N 1/2258; G01N 1/2205; G01N 1/38; G01N 2001/2264; G01N 2001/2288; G01N 2001/386; G01N 2001/2261
  See application file for complete search history.

(56) References Cited

U.S. PATENT DOCUMENTS

| | | | |
|---|---|---|---|
| 3,817,100 A | 6/1974 | Anderson et al. | |
| 4,657,744 A | 4/1987 | Howard | |
| 4,974,455 A | 12/1990 | McGowan et al. | |
| 5,039,322 A * | 8/1991 | Holzl ................... | B01D 46/448 73/863.24 |
| 5,184,501 A | 2/1993 | Lewis et al. | |
| 5,458,010 A * | 10/1995 | Traina ................ | G01N 33/0011 73/864.34 |
| 6,200,819 B1 | 3/2001 | Harvey et al. | |
| 6,546,812 B2 | 4/2003 | Lewis | |

(Continued)

FOREIGN PATENT DOCUMENTS

| | | |
|---|---|---|
| CN | 106527544 B | 5/2018 |
| GB | 966064 A | 8/1964 |

(Continued)

*Primary Examiner* — David Z Huang
(74) *Attorney, Agent, or Firm* — MEAGHER EMANUEL LAKS GOLDBERG & LIAO, LLP

(57) ABSTRACT

Disclosed is a system and method for low-pressure, low-flow dilution extraction. The system includes an outer housing, an inner housing partially within a heating element, and a manifold connected to the inner housing, having taps for a sample nozzle and dilution nozzle, and a through hole connecting the sample and dilution nozzle taps to allow a sample gas from, e.g., a stack to mix with a dilution gas before being drawn at a low pressure towards a gas analyzer.

15 Claims, 7 Drawing Sheets

(56) References Cited

U.S. PATENT DOCUMENTS 8,467,064 B2    6/2013  Lonigro et al.
8,511,141 B2 *  8/2013  Brand .................. G01N 1/2258
                                                73/23.31

FOREIGN PATENT DOCUMENTS

| | | | |
|---|---|---|---|
| GB | 1336253 | A | 11/1973 |
| JP | 2006145341 | A | 4/2010 |
| KR | 100907875 | B1 | 7/2009 |
| WO | 2001084111 | A1 | 11/2011 |

\* cited by examiner

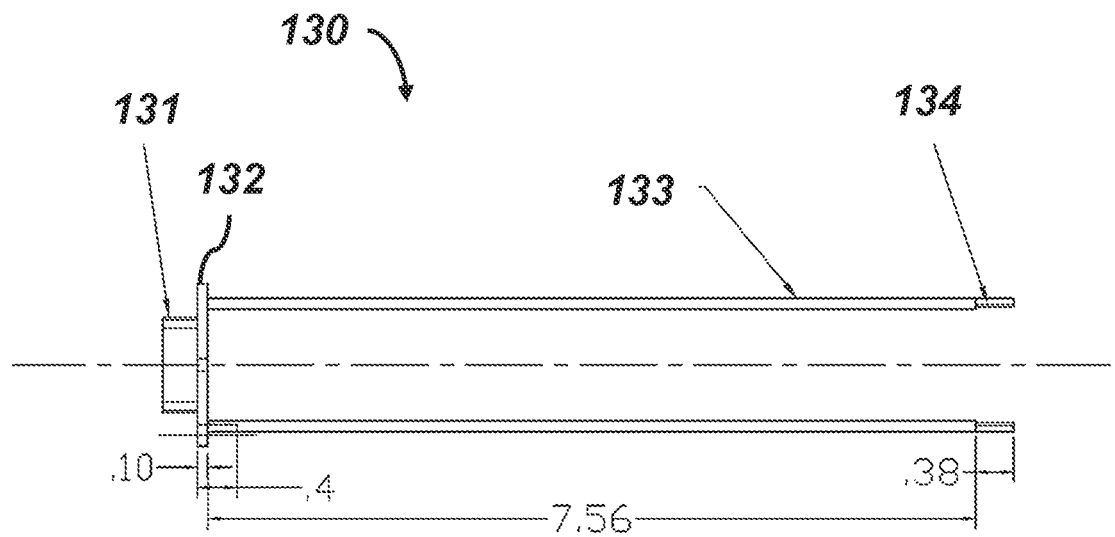
FIG. 3A
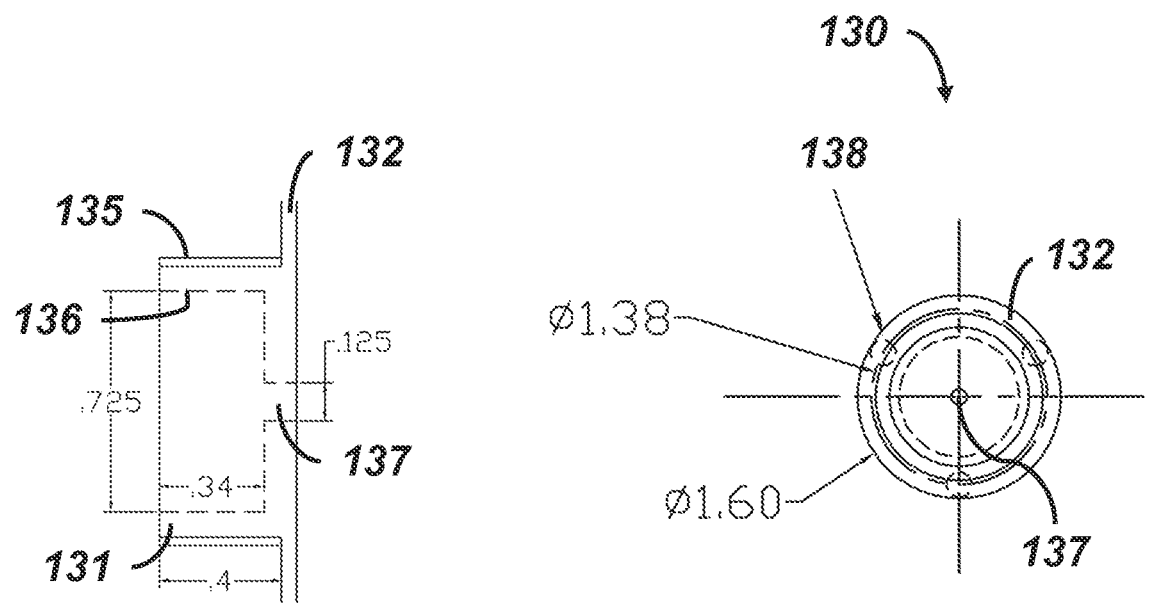
FIG. 3B
FIG. 3C

SYSTEM AND METHOD FOR LOW PRESSURE LOW FLOW DILUTION EXTRACTION GAS SAMPLING

CROSS-REFERENCE TO RELATED APPLICATIONS

This application claims benefit of U.S. Provisional Application No. 62/794,822, filed Jan. 21, 2019, which is hereby incorporated in its entirety by reference.

FIELD OF THE INVENTION

This invention generally relates to extractive gas sampling systems, and specifically to dilution extraction gas sampling of fossil fuel combustive gases being vented through a stack.

BACKGROUND

Current governmental specifications set forth by the United States Environmental Protection Agency (EPA) for compliance testing of emissions at stationary sources requires extractive gas sampling. Sources of emissions of harmful chemicals, including fossil fuel power plants and other stationary emitting sources are required to monitor emitted levels of various gaseous species. These species include sulfur dioxide (SO2), hydrogen chloride (HCl), and hydrogen cyanide (HCN).

Current extractive systems fail to accurately measure what are known as "sticky" pollutants (including, e.g., HCN) that adhere to various internal ducts or piping. Thus, a system capable of accurately monitoring these "sticky" pollutants is desirable.

BRIEF SUMMARY

A first aspect of the present disclosure is drawn to a low-pressure, low-flow dilution extraction gas probe end assembly. The assembly includes an outer probe housing, a helical heating element, an inner probe housing, a calibration tee, a sample nozzle, a dilution nozzle, a manifold, and a duct. The helical heating element positioned in a cavity within the outer probe housing. The inner probe housing is at least partially within the helical heating element. The inner probe housing has one end capable of being inserted into an opening at an end of the outer probe housing. When in position, the inner probe housing has a second end facing a second end of the outer probe housing. The calibration tee is positioned within the inner probe housing, the calibration tee having a first port for receiving a sample gas, a second port for receiving a calibration gas, and a third port. The temperature- and pressure-regulated sample nozzle is within the inner probe housing, and has an inlet operably connected to the third port and adapted to receive the sample gas. The temperature- and pressure-regulated dilution nozzle is adapted to receive a dilution gas. The manifold is connected to the second end of the inner probe housing and is operably connected to the sample nozzle and the dilution nozzle, allowing the manifold to direct the dilution gas to mix with the sample gas. The duct connects to an outlet from the manifold and is adapted to receive the mixture of the sample gas and dilution gas.

Optionally, the assembly may also include a probe end cap connecting to the first end of the inner probe housing and being adapted to hold a coarse filter capable of allowing the sample gas to enter the inner probe housing. Optionally, the assembly may also include a fine filter positioned between the third port of the calibration tee and the sample nozzle. In some embodiments, the outer probe housing is relatively small, and may have an inner diameter of less than or equal to 1.5 inches and a length of less than 10 inches. In some embodiments, the inner probe housing may have an inner diameter of less than or equal to 1 inch. In some embodiments, the manifold contains a through hole adapted to allow the dilution gas to mix with the sample gas, the through hole having an inner diameter of less than 0.1 inches.

A second aspect of the present disclosure is drawn to a low-pressure, low-flow dilution extraction gas system. The system includes a probe end assembly as previously described, as well as a gas analyzer and vacuum pump operably connected to the duct of the probe end assembly.

Optionally, the outer probe housing may be connected to a pipe coupling, which may be operably connected to a probe stinger, and the probe end may be positioned inside a stack.

A third aspect of the present disclosure is drawn to a method for low-pressure, low-flow dilution extraction gas sampling. The method typically requires (a) passing a sample gas from a stack through a sample nozzle in a sample nozzle tap of a manifold that is positioned within the stack, (b) forming a dilute mixture by passing a dilution gas through a dilution nozzle in a dilution nozzle tap on the manifold and through a through hole connecting the dilution nozzle tap with the sample tap, the through hole having an inner diameter of less than 0.1 inches so as to mix the dilution gas with the sample gas within the manifold; and (c) transporting the mixture to at least one analyzer and maintaining vacuum on the mixture sufficient to maintain a dew point of the mixture below a predetermined threshold.

Optionally, the method includes filtering particulates from the sample gas prior to passing through the sample nozzle. Optionally, the stack is carrying a fossil-fuel flue gas. Optionally, the dilution ratio is between 1:1 and 200:1. In some embodiments, a pressure of the mixture is less than 0.1 atmospheres. In some embodiments, the dilution nozzle is operable connected to a compressed gas cylinder. Optionally, the dilution gas is a gas selected from the group consisting of compressed air and nitrogen. In some embodiments, the sample gas contains sulfur dioxide ($SO_2$), hydrogen chloride (HCl), hydrogen cyanide (HCN), nitric oxide (NO), nitrogen dioxide ($NO_2$), or a combination thereof.

BRIEF DESCRIPTION OF FIGURES

The present invention is illustrated by way of example, and not by way of limitation, in the figures of the accompanying drawings and in which:

FIG. 3A is a side view of an embodiment of the inner probe housing.

FIG. 3B is a detailed side view of an embodiment of the first end of the inner probe housing.

FIG. 3C is a front view of an embodiment of the inner probe housing.

DETAILED DESCRIPTION

As used herein, the term "duct" means any enclosed passage for conveying a liquid or gas substance. This includes tubing and piping. The cross-section of the duct may be any shape, including circular or square. The tubing may optionally be metal or a polymer.

The present disclosure is drawn to a device, system, and method that can be used for monitoring gasses being released by stationary sources. The disclosed low-pressure, low-flow dilution extraction gas sampling probe can be placed or inserted into a stack, where the probe can gather a sample of the gas in the stack. The sample gas may contain a fossil-fuel flue gas. In certain embodiments, the sample gas may contain one or more gases including, but not limited to, sulfur dioxide ($SO_2$), hydrogen chloride (HCl), hydrogen cyanide (HCN), nitric oxide (NO), and/or nitrogen dioxide ($NO_2$). The sample gas is drawn into the probe and then passes through a sample nozzle that is operably connected to a manifold (preferably, the sample nozzle is directly connected to a sample nozzle tap in the manifold). The sample nozzle and manifold are positioned within the stack. Optionally, the sample gas is filtered using one, two, or more filters prior to entering the sample nozzle.

A dilute mixture is then formed by passing a dilution gas through a dilution nozzle that is operably connected to the manifold (preferably, the dilution nozzle is directly connected to a dilution nozzle tap in the manifold). The dilution gas then passes through a through hole to near the exit from the sample nozzle, so as to mix the dilution gas with the sample gas within the manifold. In some embodiment, the dilution ratio is between 1:1 and 200:1 dilution gas:sample gas (by volume). In certain embodiments, the dilution gas can include, but is not limited to, compressed air and/or nitrogen.

The mixture of sample gas and dilution gas is then transported to at least one analyzer, and vacuum is maintained on the mixture sufficient to maintain a dew point of the mixture below a predetermined threshold. In some embodiments, the predetermined threshold is 30 degrees F., preferably 10 degrees F., more preferably −10 degrees F., and still more preferably −25 degrees F. In some embodiments, the pressure of the mixture is less than 1 atm, preferably less than or equal to 0.5 atm, more preferably less than or equal to 0.25 atm, and still more preferably less than or equal to 0.1 atm.

In some embodiments, the flow rate of the mixture through a duct operably connected to the manifold is less than 100 cc/min.

Figure 1:
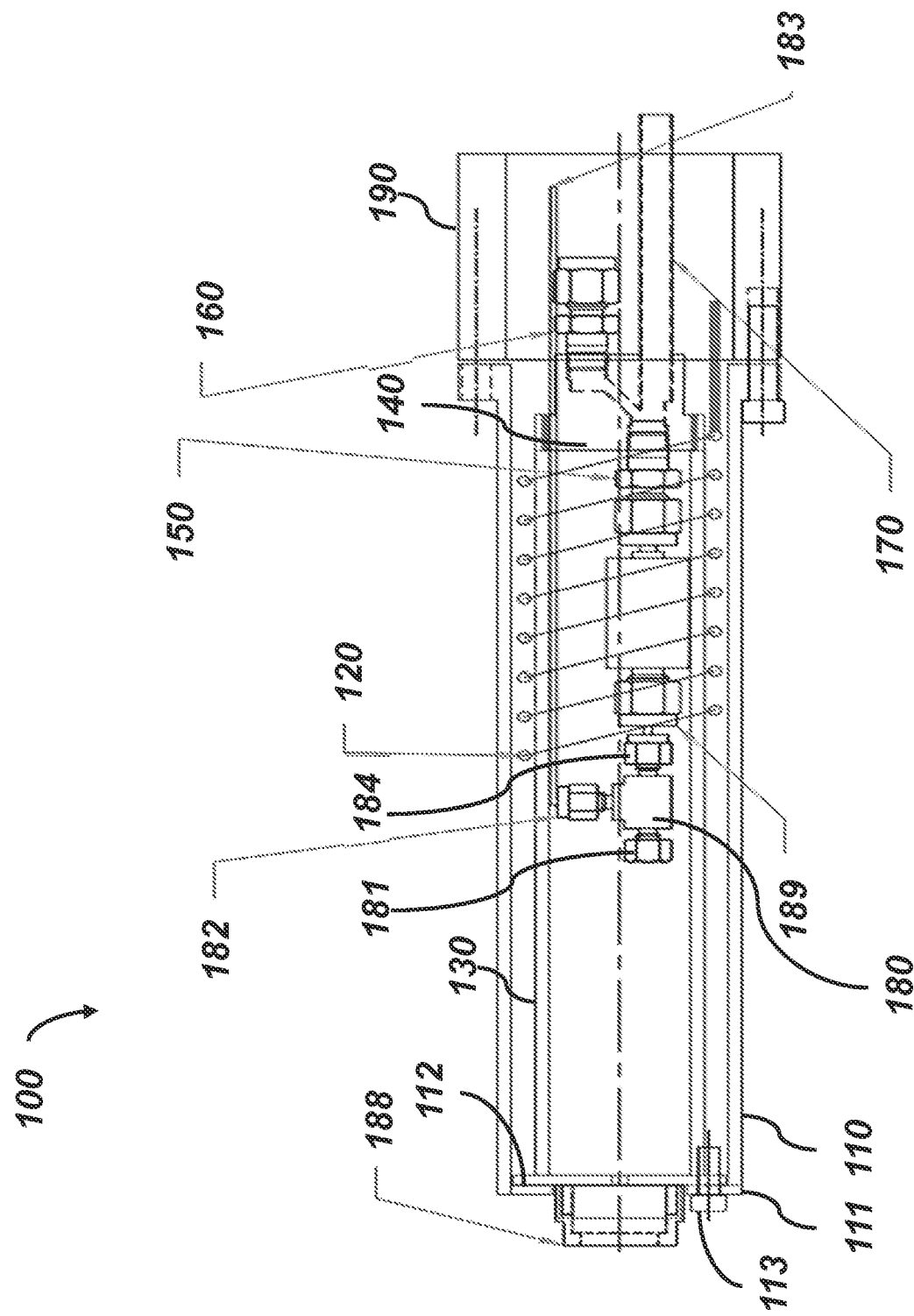
FIG. 1 is a side view of an embodiment of a disclosed probe end assembly.

The low-pressure, low-flow dilution extraction gas probe end assembly (100) can be seen in reference to FIG. 1. As seen, the assembly generally consists of several components: an outer probe housing (110), a heating element (120), an inner probe housing (130), a manifold (140), a sample nozzle (150), a dilution nozzle (160), a duct (170), and optionally other components, such as a calibration tee (180), coarse filters (188), fine filters (189), a pipe coupling (190), and end probe caps (not shown). Each of these will be discussed in order, below. In some embodiments, all or substantially all of the materials in the probe end assembly (100) are comprised of metal, preferably an appropriate grade of stainless steel, such as 316SS.

Figure 2A:
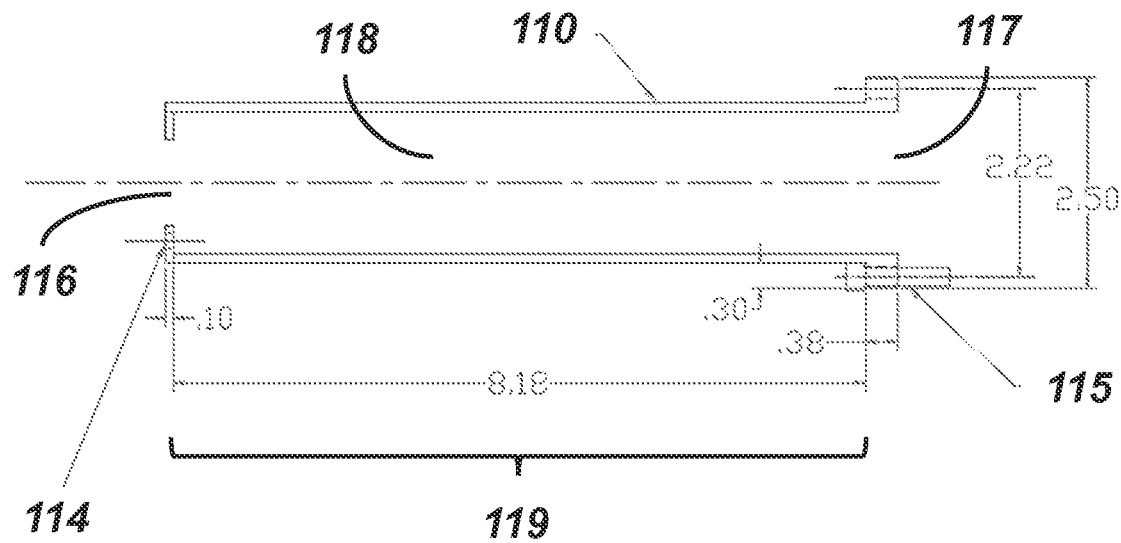
FIG. 2A is a side view of an embodiment of the outer probe housing.
Figure 2B:
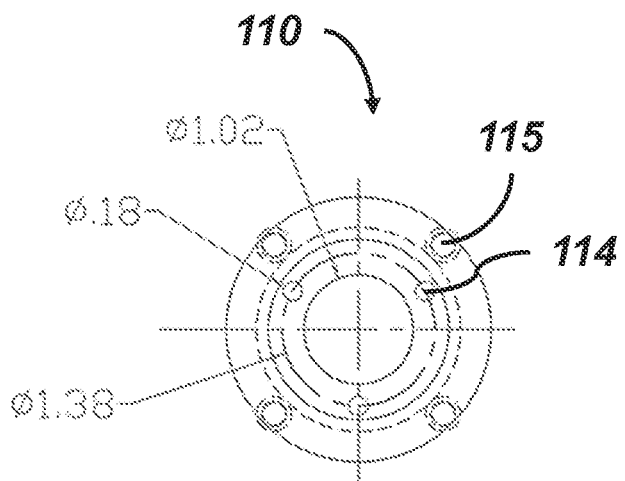
FIG. 2B is a front view of an embodiment of the outer probe housing.

The first component is the outer probe housing (110), which can best be understood with reference to FIGS. 1, 2A, and 2B. The outer probe housing (110) generally consists of a cylindrical body, with openings (116, 117) at both ends, the body defining a generally cylindrical inner cavity (118).

The outer probe housing (110) is typically made from a metal, typically a steel, such as a 316 or 316L stainless steel.

In certain embodiments, the central section (119) of the outer probe housing (110) has an inner diameter of between 0.75 and 3 inches. In preferred embodiments, that inner diameter is between 0.75 and 2 inches. In still more preferred embodiments, that inner diameter is between 1.25 and 2 inches. In certain embodiments, the central section (119) has a length of between 6 and 10 inches. In preferred embodiments, that length is between 6 and 9 inches. In still more preferred embodiments, that length is between 7 and 9 inches. In some embodiments, the outer probe housing is primarily in the form of a thin walled pipe. The inner surface of this central section is typically smooth, allowing the inner probe housing to be slide into and out of the inner cavity (118) without significant difficulty.

In certain embodiments, the first end of the outer probe housing (110) is partially covered with a thin walled portion (111). The thickness of this portion is typically less than 0.5 inches, having a preferred thickness of about 0.1 inches. In certain embodiments, the thin walled portion (111) also contains holes (114) configured to allow an inner probe housing (130) to be secured against an inner surface (112) of the thin walled portion (111) via, e.g., socket head screws (113). In one embodiment, the socket head screws are #8-32"×0.5" socket head screws. In certain embodiments, the thin walled portion (111) also contains a hole (116) having a diameter of approximate 1 inch to allow at least some of the inner probe housing (130) to protrude through the hole.

In certain embodiments, the second end of the outer probe housing has a reinforced portion adapted for securing the second end of the outer probe to, e.g., a pipe coupling (190) via, e.g., socket head screws through holes (115) in the reinforced portion. In one embodiment, the socket head screws are #12-24"×1" socket head screws. In some embodiments, the thickness of the reinforced portion is less than 0.5 inches. In some embodiments, the length of the reinforced portion is less than 0.5 inches.

The second component is the heating element (120). Generally, this is a helical heating element positioned within the internal cavity (118) of the outer probe housing (110). The heating element (120) is generally configured to control the temperature in and around the manifold (140) that connects to the sample nozzle (150) and dilution nozzle (160). In certain embodiments, this is done electrically. In other embodiments, it is done with steam. In still other embodiments, a heat transfer liquid is utilized. In some embodiments, the heating element is used to maintain a temperature of above about 200 degrees F. in and around the manifold, sample nozzle, and dilution nozzle. In preferred embodiments, the heating element is used to maintain a temperature above 250 degrees F., in and around the manifold, sample nozzle, and dilution nozzle.

The third component is the inner probe housing (130), best understood with reference to FIGS. 1, 2A, 3A, 3B, and 3C. There are four optional sections of an inner probe housing (131, 132, 133, 134), connected in series, each of which will be discussed below. In preferred embodiments, the inner probe housing comprises all four sections. In some embodiments, only three sections are used.

Referencing FIGS. 1, 2A, 3A, and 3B, the first optional section (131) of the inner probe housing (130) is adapted to protrude through the hole (116) in the thin walled portion (112) of the outer probe housing (110). This first cylindrical section (131) may be less than 0.5 inches in length. In preferred embodiments, it is between 0.3 and 0.4 inches in length. In some embodiments, a removable probe end cap (not shown) is attached at least partially over the outer surface of the first cylindrical section (135). In some embodiments, the outer surface of the first cylindrical section (135) may optionally be at least partially threaded. In some embodiments, there is threading on the inner surface of the first cylindrical section (136). In one embodiment, the threads are M20×1.5, 0.4" deep male threads. In some embodiments, the threading is configured to allow the removable probe end cap (not shown) to be attached without bolts.

Referencing FIGS. 1, 2A, 3A, 3B, and 3C, the second optional section (132) of the inner probe housing (130) is configured to be approximately the same diameter as the inner diameter of the central section (119) of the outer probe housing (110) (i.e., the same diameter as defined by the central internal cavity (118)). The second optional section (132) is adapted to allow the inner probe housing (130) to be secured against the inner surface (112) of the thin walled portion (111) at the first end of the outer probe housing (110). As discussed above, there may be holes (138) through the second optional section (132), which are configured to align with the holes (114) through the first optional section (131), in order to allow the sections to be, e.g., screwed or bolted together.

The second optional section (132) also contains a small hole (137) through which a sample gas may pass. The small hole (137) generally has a diameter of less than or equal to 0.2 inches, preferably less than or equal to 0.15 inches, and more preferably less than or equal to 0.125 inches.

Referencing FIG. 3A, the third optional section (133) may have an inner diameter of between 0.5 and 2 inches, preferably between 0.5 and 1.75 inches, and more preferably between 0.75 and 1.75 inches. The third optional section (133) may have a length of between 6 and 10 inches, preferably between 6 and 9 inches, and more preferably between 7 and 9 inches. In some embodiments, this third optional section (133) is primarily in the form of a thin walled pipe. The inner surface of the third optional section (133) is typically smooth.

Referencing FIG. 3A, the fourth optional section (134) may have an inner threaded portion adapted for allowing a removable manifold (140) to be attached without screws. In other embodiments, the manifold (140) is bolted into place.

The fourth component of the low-pressure, low-flow dilution extraction gas probe end assembly (100) is the manifold (140). Referring to FIG. 1, it can be seen that the manifold (140) can be configured so that at least a portion of the manifold is inside the inner probe housing (130). Preferably, one end of the manifold is screwed into the fourth optional section (134) of the inner probe housing (130).

Figure 4A:
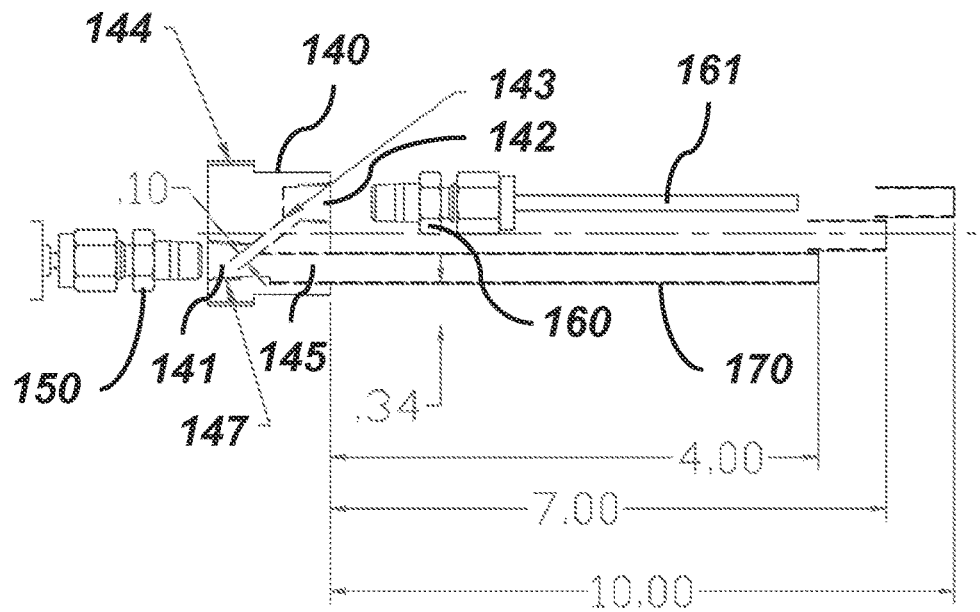
FIG. 4A is a side view of an embodiment of the manifold, dilution nozzle, and sample nozzle.
Figure 4B:
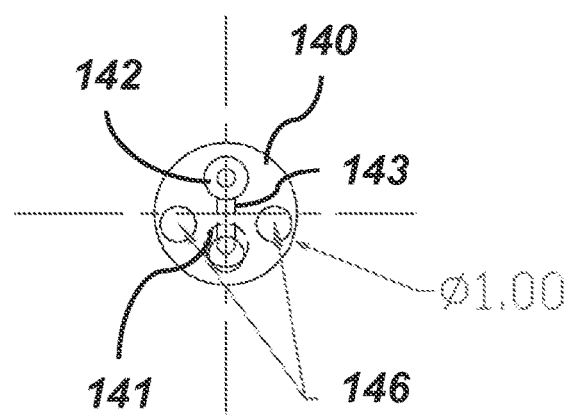
FIG. 4B is a front view of an embodiment of the manifold.
Figure 4C:
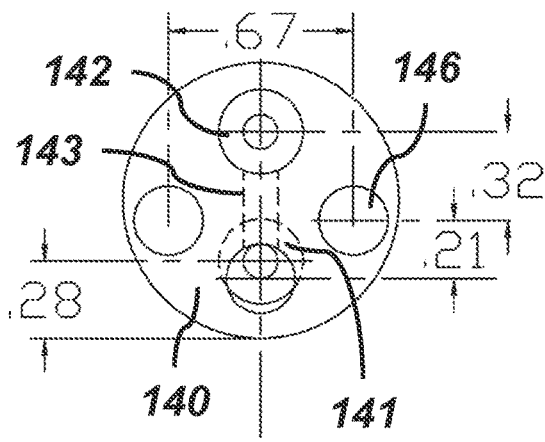
FIG. 4C is a detailed front view of an embodiment of the manifold.

Referring to FIGS. 4A, 4B, and 4C, it is seen that the manifold may have multiple holes, ports, and/or connection points, including a sample port (141), a dilution port (142), an output port (145), and one or more holes (146) passing through the manifold. The manifold is designed be operably connected to both a sample nozzle (150) and a dilution nozzle (160). In certain embodiments, the manifold contains taps (147) for the sample nozzle (150) and dilution nozzle (160), and in preferred embodiments, the sample nozzle (150) screws directly into the sample port (141) on the manifold, and the dilution nozzle (160) screws directly into the dilution port (142) on the manifold. The sample and dilution ports are typically positioned on opposite sides of the manifold, with the sample port (141) facing the direction from which the sample gas will be arriving (e.g., through the small hole (137) on the inner probe housing (130). In preferred embodiments, a through hole (143) is drilled or created, connecting the dilution port (142) with the sample port (141). In certain embodiments, the centerline of the through hole (143) is configured to be non-parallel and non-perpendicular to the centerline of the manifold. In certain embodiments, the centerline of the through hole (143) is configured to be non-parallel and non-perpendicular to the centerline of one or both of the sample port tap or the dilution port tap. In some embodiments, the through hole (143) has a diameter less than 0.2 inches or less. In some embodiments, the through hole (143) has a diameter of 0.15 inches or less. In some embodiments, the through hole (143) has a diameter of 0.10 inches or less.

In some embodiments, a portion of the outer surface (144) of the manifold contains threading. In some embodiments, the manifold contains M30×1 or smaller threading. In certain embodiments, this threading allows the manifold to be removably attached to the inner probe housing without, e.g., screws.

Referring to FIG. 4A, the manifold is also connected to a duct (170) that allows the dilution gas and sample gas mixture to be drawn away from the manifold (140). The duct (170) is operably connected to the output port (145), and the output port is operably connected to the sample port (141). Thus, during operation, the dilution gas flows into the manifold and down the through hole, where it mixes with the incoming sample gas, after which the mixed gas then flows into the output port and down the duct.

The fifth component of the low-pressure, low-flow dilution extraction gas probe end assembly (100) is the sample nozzle (150). Referring to FIGS. 1 and 4A, it is seen that the sample nozzle is a temperature- and pressure-regulated sample nozzle within the inner probe housing (130), and is configured to receive a sample gas. The sample nozzle (150) is operably connected to the sample port (141) of the manifold (140). Thus, the sample nozzle (150), as well as any other surface that comes into contact with the sample gas, should not react with such gasses.

The sixth component of the low-pressure, low-flow dilution extraction gas probe end assembly (100) is the dilution nozzle (160). Referring to FIGS. 1 and 4A, it is seen that the dilution nozzle is a temperature- and pressure-regulated dilution nozzle configured to receive a dilution gas. The dilution nozzle (160) is operably connected to the dilution port (142) of the manifold (140). The dilution gas will typically be transported to the dilution nozzle (160) via a dilution feed duct (161).

The seventh component of the low-pressure, low-flow dilution extraction gas probe end assembly (100) is the duct (170). The duct (170) is configured to transport the mixture of the sample gas away from the manifold, allowing that mixture of gasses to be analyzed. Typically, the duct is configured to be operably connected to, e.g., a gas analyzer and a vacuum pump.

One optional component is a calibration tee (180). As seen in FIG. 1, the calibration tee is positioned within the inner probe housing. It contains a sample port (181) for receiving sample gas. It contains a calibration port (182) for receiving a calibration gas, which may optionally be delivered via a calibration gas duct (183) that is operably connected to, e.g., a compressed gas cylinder containing the calibration gas. The calibration tee also contains an outlet port (184), for directing the sample gas towards the sample nozzle (150).

Another optional component is a coarse filter (188). As seen in FIG. 1, in some embodiments, a coarse filter (188) is placed at or near the end of the inner probe housing through which the sample gas is received, preventing large particulates from entering the probe assembly (100) and potentially clogging or blocking, e.g., the calibration tee sample port (181).

Another optional component is a fine filter (189). As seen in FIG. 1, in some embodiments, a fine filter (189) is positioned between the outlet port of the calibration tee (184) and the sample nozzle (150).

Figure 5A:
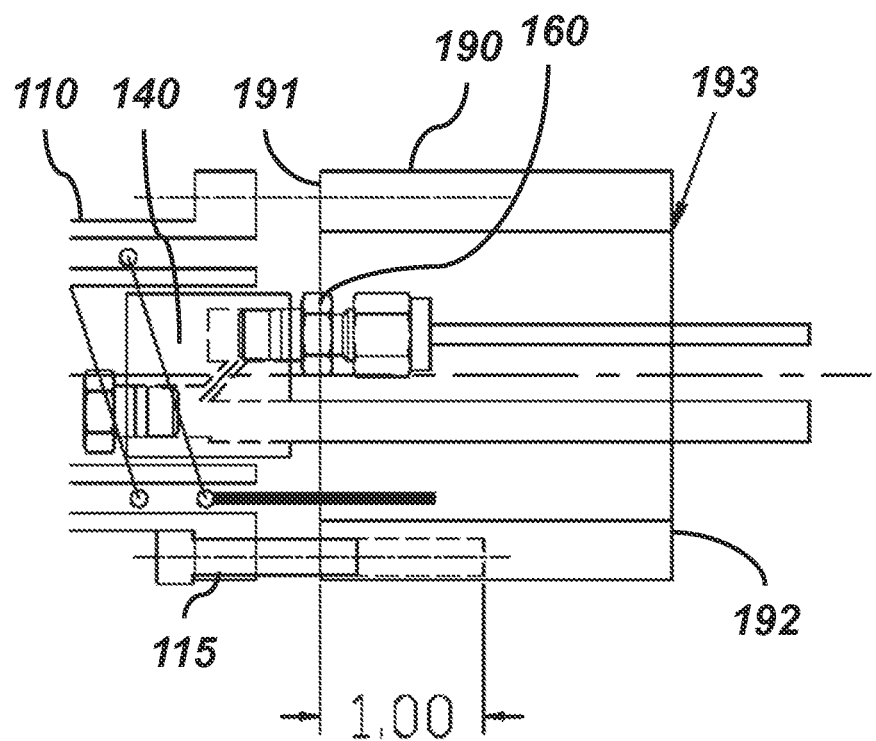
FIG. 5A is a side view of an embodiment of the pipe coupling.
Figure 5B:
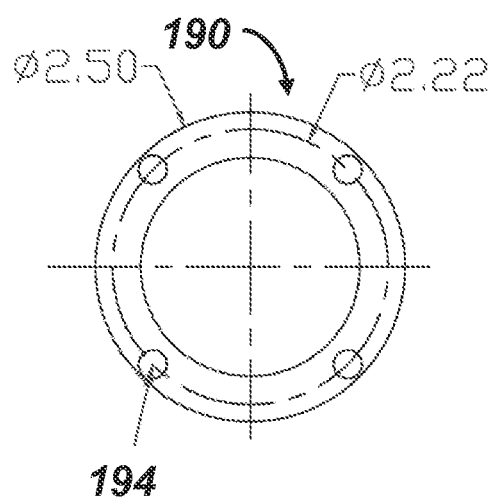
FIG. 5B is a front view of an embodiment of the pipe coupling.

As seen in FIGS. 1, 5A, and 5B, a probe end assembly (100) may also optionally include a pipe coupling (190). The pipe coupling is generally configured such that a first open end (191) connects or is operably attached to the second end of the outer probe housing (110), typically via, e.g., screws that pass through holes (115) in the outer probe housing (110) as well as, e.g., tapped holes (194) in the first end (191) of the pipe coupling (190). In some embodiments, the tapped holes are #12-24 holes, in four locations.

The pipe coupling is typically configured such that it surrounds at least part of the manifold (140). In some embodiments, it also surrounds at least part of the dilution nozzle (160). The pipe coupling also has a second open end (192) opposite the first end (191). This end may also contain tapped holes, or threads for connecting to other components. In some embodiments, an inner surface of the pipe coupling (193) is threaded, e.g., by female threads.

Typically, the inner surface (193) is the same diameter as the inner surface of the outer probe housing (110). In some embodiments, the length of the pipe coupling is less than or equal to 12 inches. In some embodiments, the length of the pipe coupling is less than or equal to 6 inches. In some embodiments, the length of the pipe coupling is less than or equal to 3 inches.

Figure 6A:
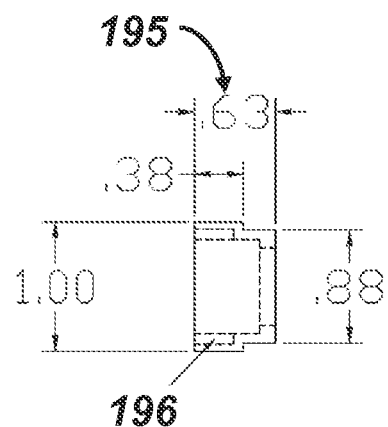
FIG. 6A is a side view of an embodiment of the probe end cap.
Figure 6B:
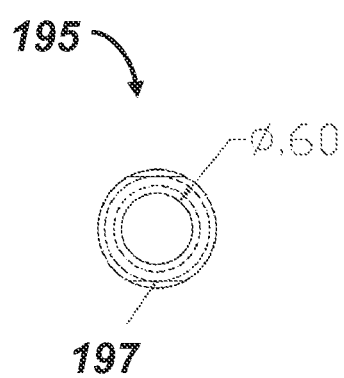
FIG. 6B is a front view of an embodiment of the probe end cap.

As seen in FIGS. 6A and 6B, and as previously discussed in reference to FIG. 3B, a system using a probe end assembly (100) may also optionally include a probe end cap (195). This end cap (195) is preferably removably connected to the first optional section (131) of the inner probe housing (130), which protrudes from the first end of the outer probe housing (110). In some embodiments an inner surface of the end cap (196) is in contact with an outer surface of the first optional section (131) of the inner probe housing (130). In some embodiments, that inner surface of the end cap (196) is threaded, e.g., by M20×1.5 0.3" deep female threads. In some embodiments, the end cap (195) contain one or more flat or otherwise non-cylindrical surfaces (197). These surfaces (197) may function as, e.g., wrench grips, allowing a tool to be used more readily remove the end caps (195). In some embodiments, a coarse filter (188) may be positioned within the probe end cap, over the opening to the first cylindrical portion of the inner housing, to filter the sample gas entering the probe end.

In certain embodiments, the probe assembly also include various assembly fittings. In some embodiments, the assembly fittings are ½", ⅛", or 1/16", or similarly-sized metric fittings. Generally, the size of the fittings plays a major role in determining the dimensions of the probe end assembly. As the size of the fittings is reduced, the required dimensions of the probe assembly are also reduced.

Figure 7:
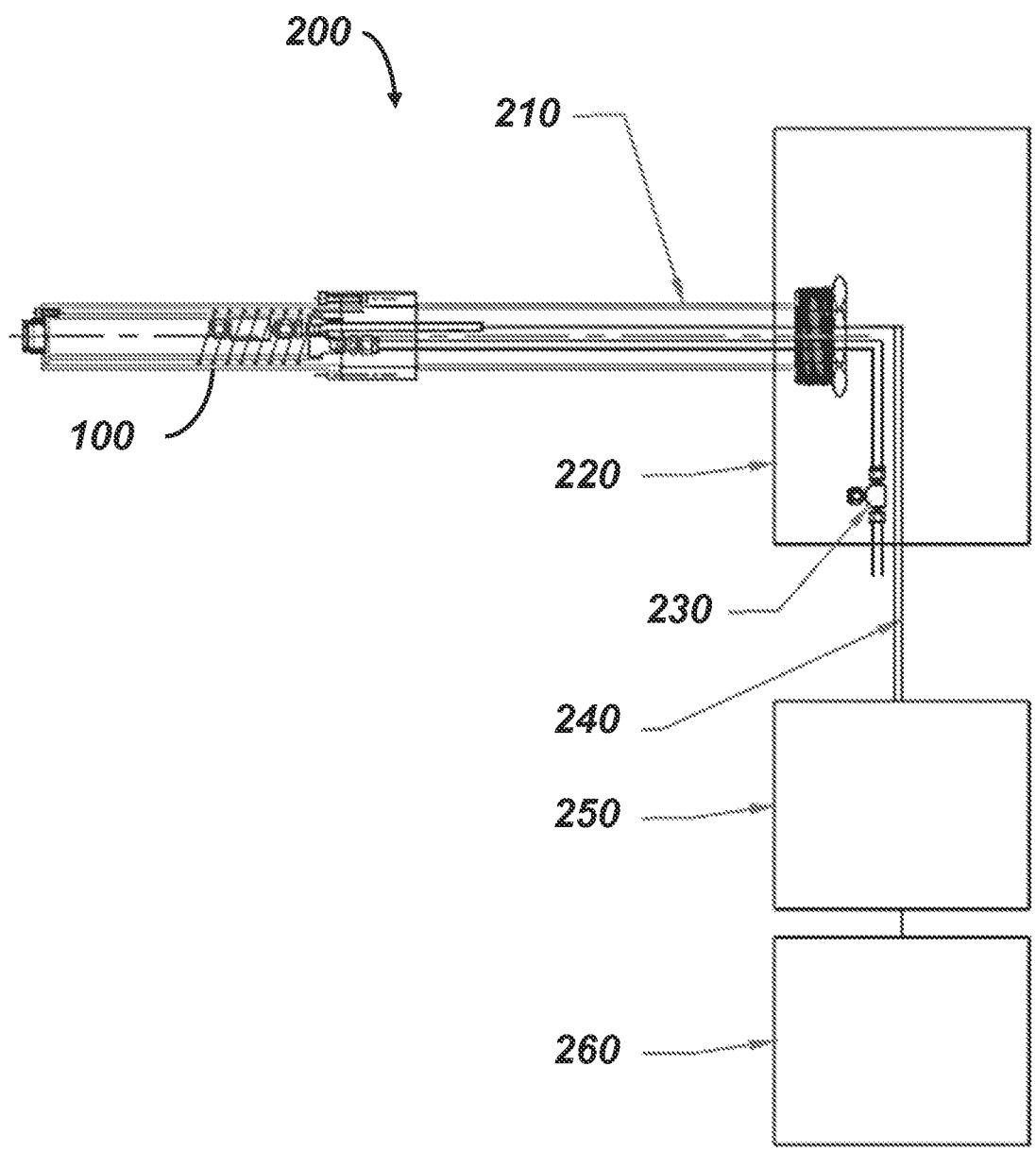
FIG. 7 is a side view of an embodiment of a disclosed system.

An embodiment of a system using the probe assembly (100) can be seen in FIG. 7. The system (200) is generally configured such that the some of the parts of the system can be inserted into, e.g., a sampling port in a flue-gas stack, while other parts can remain outside the stack. In particular, in the system (200), the low-pressure, low-flow dilution extraction gas probe end assembly (100) may be connected to a probe stinger (210). The probe stinger (210) can be mounted or attached to a probe enclosure (220), located outside the stack. In some embodiments, the probe stinger (210) is designed to connect to either the pipe coupling (190) or directly to the outer probe housing (110). The combination of the probe assembly with the stinger can be configured such that the combination can be moved within the flue to control the location within a stack that the probe end assembly takes a gas sample.

In some embodiments, the dilution gas that is fed to the dilution nozzle (160) may be configured to pass from the source (e.g., a pressurized feed of nitrogen or compressed air) through a dilution air tee (230), with an open overflow port, before being fed through the dilution feed duct (161) to the dilution nozzle (160). The dilution air tee (230) may be located in the probe enclosure (220) outside the stack.

In some embodiments, the duct (170) operably connected to the manifold (140) leads to the probe enclosure (220) outside the stack. In some embodiments, the duct (170) is directly connected to a gas analyzer (250) and/or vacuum pump (260). In other embodiments, the duct (170) is operably connected to a gas analyzer (250) and/or vacuum pump (260) through a sample line (240). For example, in some embodiments, it may be preferable to use, e.g., a stainless steel duct inside the flue stack, but connect it to a flexible hose outside the stack.

Those skilled in the art will recognize, or be able to ascertain using no more than routine experimentation, many equivalents to the specific embodiments of the invention described herein. Such equivalents are intended to be encompassed by the following claims

What is claimed is:

1. A method for low-pressure, low-flow dilution extraction gas sampling, comprising:
   passing a sample gas from a duct operably connected to a sample nozzle tap of a manifold that is positioned within the duct;
   forming a dilute mixture by passing a dilution gas through a dilution nozzle operably connected to a dilution nozzle tap on the manifold and through a through hole connecting the dilution nozzle tap with the sample tap, the through hole having an inner diameter of less than 0.1 inches so as to mix the dilution gas with the sample gas within the manifold;
   transporting the mixture to at least one analyzer and maintaining vacuum on the mixture sufficient to maintain a dew point of the mixture below a predetermined threshold.

2. The method according to claim 1, further comprising filtering particulates from the sample gas prior to passing through the sample nozzle.

3. The method according to claim 1, wherein the duct is carrying a fossil-fuel flue gas.

4. The method according to claim 1, wherein a dilution ratio is between 1:1 and 200:1.

5. The method according to claim 1, wherein a pressure of the mixture is less than 0.1 atmospheres.

6. The method according to claim 1, wherein the dilution nozzle is operably connected to a compressed gas cylinder.

7. The method according to claim 6, where the dilution gas is a gas selected from the group consisting of compressed air and nitrogen.

8. The method according to claim 6, where the sample gas contains a gas selected from the group consisting of sulfur dioxide ($SO_2$), hydrogen chloride (HCl), hydrogen cyanide (HCN), nitric oxide (NO), and nitrogen dioxide ($NO_2$).

9. The method according to claim 1, wherein the sample nozzle is a temperature- and pressure-regulated sample nozzle within an inner probe housing.

10. The method according to claim 9, wherein the inner probe housing is at least partially within a helical heating element.

11. The method according to claim 10, wherein the helical heating element is within an internal cavity defined by an outer probe housing.

12. The method according to claim 11, wherein the dilution nozzle is a temperature- and pressure-regulated dilution nozzle within the inner probe housing.

13. The method according to claim 12, wherein the sample nozzle and the dilution nozzle are operably coupled to a calibration tee within the inner probe housing.

14. The method according to claim 1, wherein the manifold includes a first surface and a second surface opposing the first surface, the manifold defining the sample nozzle tap on the first surface and the dilution nozzle tap on the second surface.

15. The method according to claim 14, wherein the sample nozzle tap is further coupled to an output port, the output port extending to the second surface.

* * * * *